United States Patent
Ho et al.

(10) Patent No.: US 7,571,738 B2
(45) Date of Patent: Aug. 11, 2009

(54) FLOW CONTROL DEVICE

(75) Inventors: Thanh Ho, Brunswick, OH (US);
Carolyn Dute, Spencer, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 297 days.

(21) Appl. No.: 11/370,310

(22) Filed: Mar. 8, 2006

(65) Prior Publication Data
US 2007/0209704 A1    Sep. 13, 2007

(51) Int. Cl.
*F16K 11/00* (2006.01)
(52) U.S. Cl. .................................. 137/102; 137/512.4
(58) Field of Classification Search ............... 137/102, 137/107, 512.4; 280/421; 303/69
See application file for complete search history.

(56) References Cited

U.S. PATENT DOCUMENTS

| | | | | |
|---|---|---|---|---|
| 2,567,391 | A | * | 9/1951 | Mead ......................... 137/102 |
| 3,093,153 | A | * | 6/1963 | Horowitz ..................... 137/102 |
| 4,134,417 | A | * | 1/1979 | Horowitz ..................... 137/102 |
| 4,453,780 | A | | 6/1984 | Neal |
| 4,461,313 | A | | 7/1984 | Beaumont |
| 4,596,265 | A | | 6/1986 | Goodell |
| 4,733,919 | A | * | 3/1988 | Jacobs et al. .................. 303/69 |
| 4,858,638 | A | | 8/1989 | Cseri |
| 4,878,513 | A | | 11/1989 | Ashby et al. |
| 5,305,777 | A | * | 4/1994 | Nakamura et al. .......... 137/102 |
| 5,425,572 | A | | 6/1995 | Koelzer et al. |

OTHER PUBLICATIONS

Brochure, "Bendix QR-N Quick Release Valve", Bendix Service Data, SD-03-905, 3 pgs.
Brochure, "Bendix QR-L Inline Quick Release Valve", Bendix Service Data, SD-03-906, 3 pgs.
Brochure, "Bendix QR-N-2 Quick Release Valve", Bendix Service Data, SD-03-907, 3 pgs.
Brochure, "Bendix MV-3 Dash Control Module", Bendix Service Data, SD-03-3415, 5 pgs., Mar. 2004, printed USA.
Brochure, "Bendix PP-DC Park Control Valve", Bendix Service Data, SD-03-3419, 6 pgs., Mar. 2004, printed USA.
Brochure, "Airflex Quick Release Valve Description", Eaton Corporation, 1997, 5 pgs.

* cited by examiner

*Primary Examiner*—Stephen M Hepperle
(74) *Attorney, Agent, or Firm*—Calfee, Halter & Griswold LLP

(57) ABSTRACT

A flow control device having a first port, a second port, a third port and the movable member. In a first mode, the movable member seals the second port while allowing fluid flow between the first and third ports, wherein the differential pressure between the first port and third port, during the first mode, is about zero. In the second mode, the movable member seals the first port while allowing fluid flow between the third port and second port, wherein the movable member is adapted to transition from the first mode to the second mode in response to a small change in differential pressure.

33 Claims, 6 Drawing Sheets

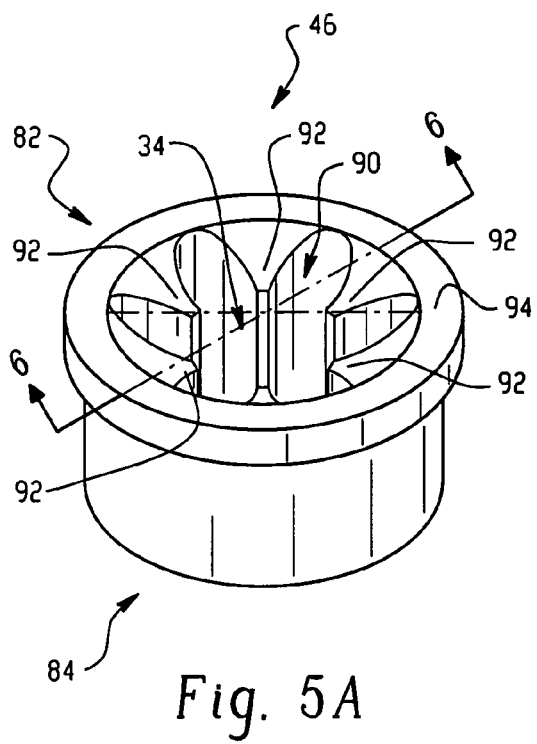 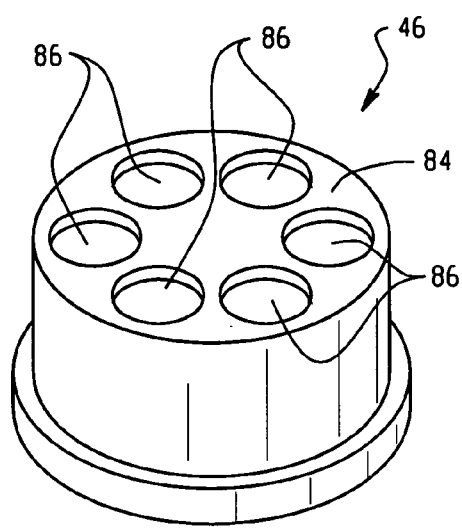
Fig. 5A   Fig. 5B
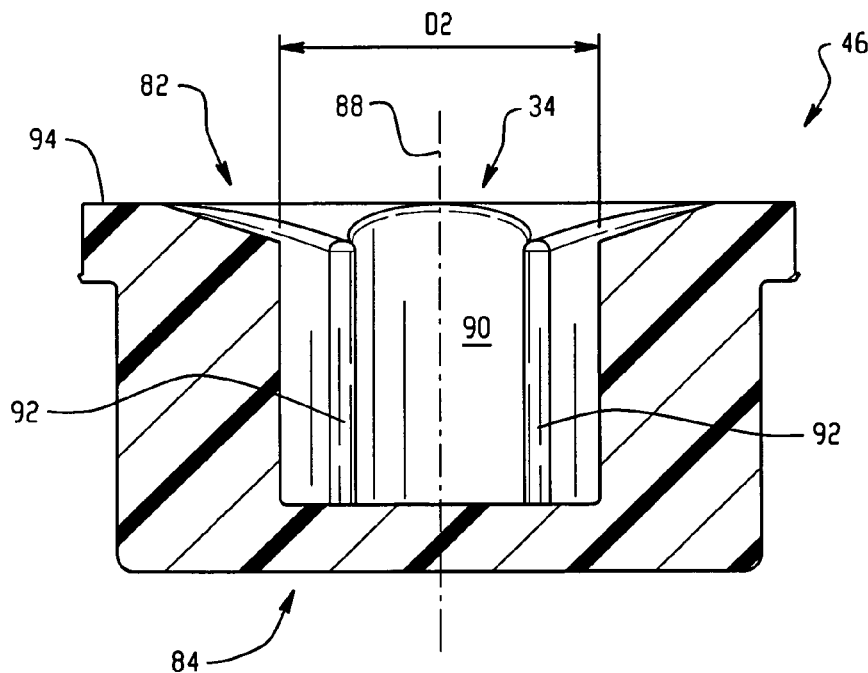
Fig. 6

FLOW CONTROL DEVICE

BACKGROUND OF THE INVENTION

In pneumatic braking systems for heavy-duty trucks, air is vented from the pneumatic lines to release the service brakes. The lag time between the actual release of a brake pedal and the actual release of the vehicle brakes is referred to as brake release timing. Users desire brake release timing to be as small as possible. To enhance brake release timing, quick release valves are commonly employed. Quick release valves are typically installed in the air brake system at a point between the supply air volume and the delivery air volume. Upon release of the brake pedal, air that was delivered to the brakes is rapidly vented from the quick release valve instead of flowing all the way back to the air supply.

A known type of quick release valve is illustrated in FIG. 1. The valve 10 includes a housing 12 having a supply port 14, an exhaust port 16, and one or more delivery ports 18. A flexible, disk-shaped diaphragm 20 resides in the housing 12 for sealing the supply port 14 or the exhaust port 16 when desired.

In operation, when the driver depresses the brake pedal, air flows into the supply port 14 causing the diaphragm 20 to seal against an exhaust seat 22. At the same time, the air forces the outer edge of the diaphragm 20 downward, resulting in air flowing from the supply port 14 to the delivery ports 18. When the driver releases the brake pedal, the air pressure at the supply port 14 is reduced. The air that had been delivered to the brakes flows back toward the supply port 14. The differential pressure across the diaphragm 20 (i.e. higher pressure in the delivery port than the pressure in the supply port) moves the diaphragm 20 upward, away from the exhaust seat 22, and into engagement with an inlet seat 24. As a result, air from the delivery volume vents through the exhaust port 16.

In some known quick release valves, a differential pressure occurs across the diaphragm when air flows from the supply port to the delivery ports. This is not desirable because it may result in an unbalanced pressure between the wheels of the vehicle. Furthermore, in some designs, the diaphragm will not establish a seal with the inlet port during brake release as rapidly as desired, especially during low-pressure applications, such as for example 30 psi or less. As a result, some delivered air may flow back into the supply port, thus degrading brake release timing.

SUMMARY

The present invention relates generally to a flow control device. In particular, the present invention relates to a flow control device that moves between a first mode and a second mode in response to a pressure differential across a movable member.

The flow control device may include a first port, a second port, a third port and the movable member. In a first mode, the movable member may seal the second port while allowing fluid flow between the first and third ports, wherein the differential pressure between the first port and third port, during the first mode, is about zero. In the second mode, the movable member may seal the first port while allowing fluid flow between the third port and second port, wherein the movable member is adapted to transition from the first mode to the second mode in response to a small change in differential pressure.

BRIEF DESCRIPTION OF THE DRAWINGS

The foregoing features of the present invention will become apparent to one skilled in the art to which the present invention relates upon consideration of the following description of the invention with reference to the accompanying drawings, in which:

FIGS. 5A and 5B are isometric views of an inlet insert of the exemplary embodiment of FIG. 2;

FIG. 6 is a sectional view of the inlet insert of FIGS. 5A and 5B taken along the 6-6 line in FIG. 5A;

DETAILED DESCRIPTION

While various aspects and concepts of the invention are described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

This application discloses a flow control device having a plurality of ports and a flexible member that is movable in response to differential pressure across the member. In a first mode, the member is in a first position in which the member allows flow between a first and third port while sealing a second port. In a second mode, the member moves to a second position, in which the member seals the first port and allows flow between the second and third ports. The flow device is configured such that when the device is in the first mode, the pressure differential between the first and third ports may be zero. Furthermore, the flexible member is adapted to rapidly transition to the second position when, in the second mode, the pressure differential between the first port and third port is small, such as for example less than 30 psi.

Figure 2:
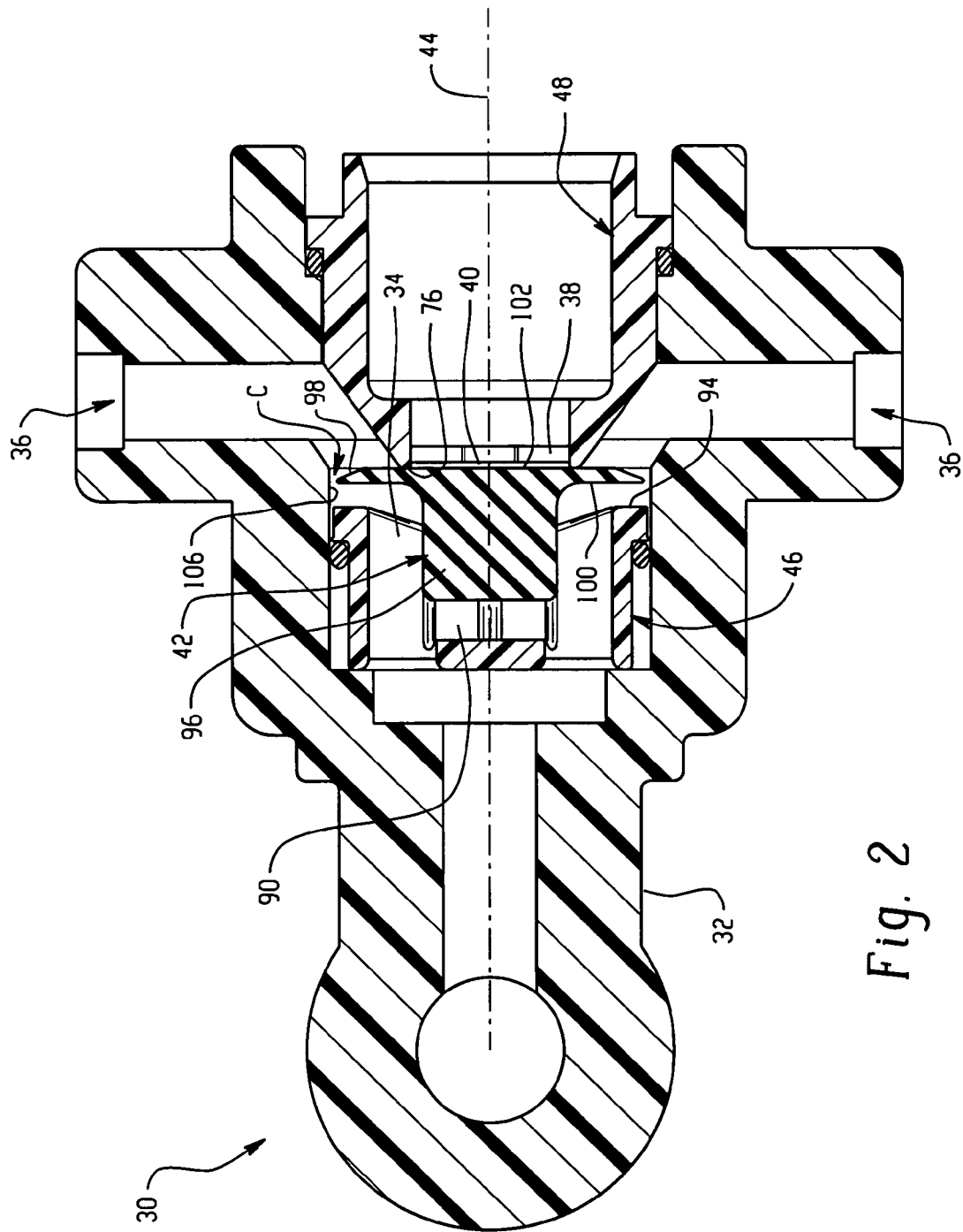
FIG. 2 is a sectional view of an exemplary embodiment of the flow control device according to the present invention in a first mode.

FIG. 2 illustrates an exemplary embodiment of the flow control device in accordance with the present invention. In the exemplary embodiment of FIG. 2, the flow control device is realized as a quick release valve for use in a vehicle air brake system. One of ordinary skill in the art, however, will understand that the concepts disclosed herein are applicable to a variety of flow control devices, such as for example, a double check valve.

The flow control device 30 includes a housing assembly 32 having an inlet or supply port 34, at least one delivery port 36, an exhaust or outlet port 38, and a chamber 40 that interconnects the ports. A movable member 42, realized in the form of a diaphragm, resides within the chamber 40 for selectively sealing one or more ports. A wide variety of configurations for the housing 32 are possible. The particular configuration of the housing 32 in FIG. 2 is presented for conveniently illustrating of the general arrangement of the ports and the movable member. Other arrangements, however, are possible. From a general perspective of flow control between ports, one of ordinary skill in the art will appreciate that the ports may be interchangeable. For example, the supply port may serve as an exhaust port or a delivery port, the delivery port may serve as a supply port or an exhaust port, and the exhaust port may serve as a supply port or a delivery port.

In the exemplary embodiment of FIG. 2, the supply port 34 and the exhaust port 38 are substantially aligned along a central axis 44, though that is not required. The supply port 34 and the exhaust port 38 may be formed as a portion of a supply insert 46 and an exhaust insert 48, respectively. The supply port 34 and exhaust port 38, however, may be formed integrally with the housing 32 or in some other suitable manner.

Figure 3A:
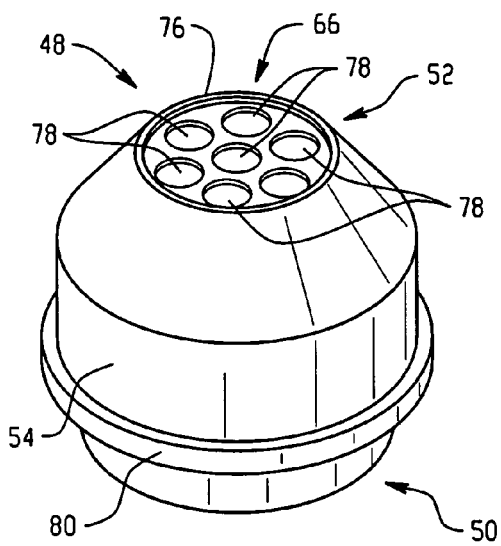
FIGS. 3A and 3B are isometric views of an exhaust insert of the exemplary embodiment of FIG. 2.
Figure 3B:
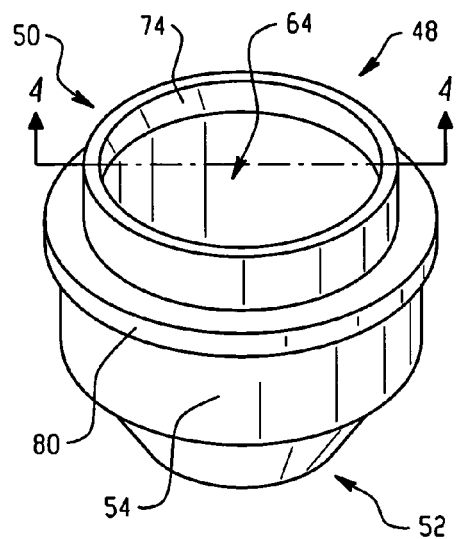
Figure 4:
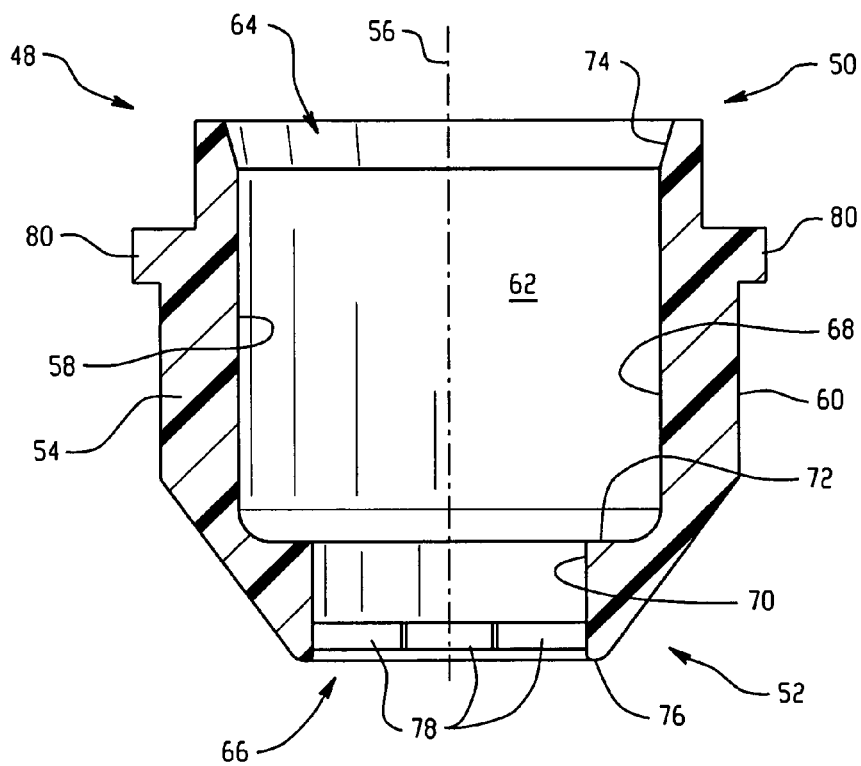
FIG. 4 is a sectional view of the exhaust insert of FIGS. 3A and 3B taken along the 4-4 line in FIG. 3A.

As shown in FIGS. 3A, 3B, and 4, the exhaust insert 48 of the exemplary embodiment of FIG. 2 has a first end portion 50 and a second end portion 52. The exhaust insert 48 includes a side wall 54 having a generally cylindrical configuration centered along a central axis 56. The side wall 54 includes generally cylindrical inner and outer side surfaces 58, 60. The inner side wall surface 58 defines a flow passage 62, including an exhaust opening 64 at the first end portion 50 and exhaust port 66 at the second end portion 52.

The inner side surface 58 includes a first and a second axially extending portion 68, 70, respectively, connected by a radially extending inner shoulder 72. The first axially extending portion 68 extends from the exhaust opening 64 to the inner shoulder 72. The first axially extending portion 68 may be configured to receive and engage with a push-to-connect fitting (not shown). The push-to-connect fitting, once inserted into the exhaust opening 64, attaches to the inner side surface 58. Thus, when the exhaust insert 48 is installed in the flow control device 30, the exhaust insert 48 functions as a connection point with another flow control device, an air line, or other flow components. The exhaust opening 64 includes a chamfer 74 to make inserting the push-to-connect fitting easier.

Referring to FIG. 4, the second end portion 52 includes an exhaust seat 76 that circumscribes the exhaust port 66. The exhaust seat 76 is adapted to form a sealing interface with the movable member 42 (see FIG. 2) when the movable member engages the seat. The exhaust port 66 is configured to include a plurality of smaller openings 78, which reduces the likelihood that the diaphragm 42 will extrude into the exhaust port 66 when the diaphragm and exhaust seat 76 are in sealing engagement.

The outer side surface 60 of the exhaust insert 48 includes a radially extending flange 80 adjacent the first end portion 50. In addition, the outer surface 60 of the second end portion 52 has a generally tapered or conical configuration. As shown in FIG. 2, the flange 80 engages corresponding structure of the housing 32 when the exhaust insert 48 is installed to ensure that the exhaust seat 76 is properly positioned. The tapered second end portion 52 helps direct air flow from the inlet port 34 to the delivery ports 36.

Referring to FIGS. 5A, 5B, and 6, the supply insert 46 has a generally cylindrical configuration with a first end 82 and a second end 84. The second end 84 includes a plurality of generally round openings 86 evenly arranged around a central axis 88. The openings 86, however, may be shaped otherwise or arranged in a manner different than illustrated in the exemplary embodiment. Furthermore, though six openings 86 are shown in FIG. 5B, any number of openings two or greater is possible.

The openings 86 are in fluid communication with a central passage 90 that extends through the supply insert 46 to the supply port 34 at the second end 84. A plurality of ribs 92 extend inward toward the central axis 88. The ribs 92 are generally interspersed between the openings 86 and extend axially along the central passage 90 to the supply port 34. A supply seat 94 circumscribes the supply port 34.

Figure 7:
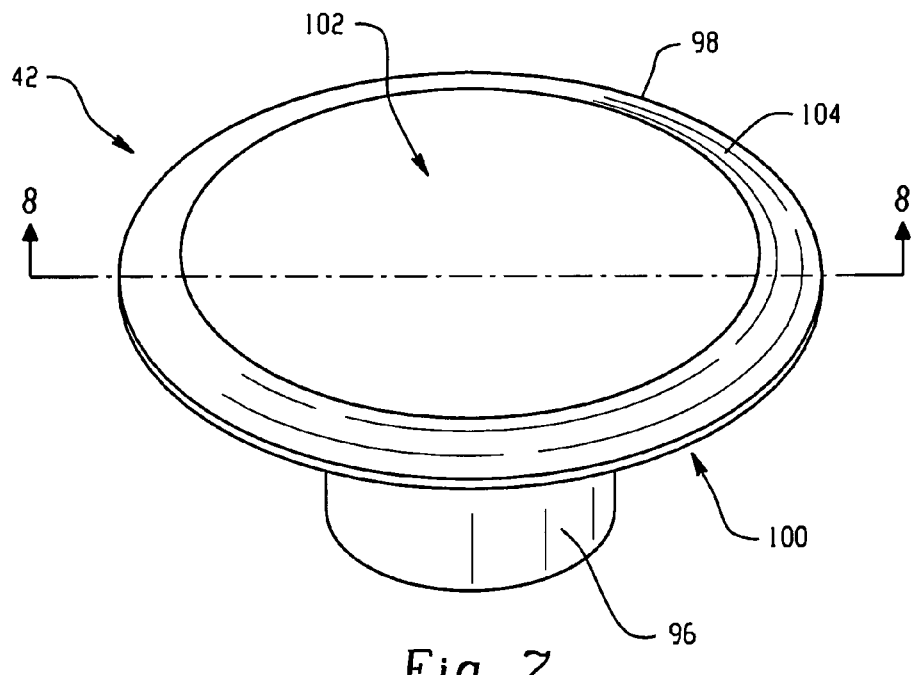
FIG. 7 is an isometric views of a diaphragm of the exemplary embodiment of FIG. 2.
Figure 8:
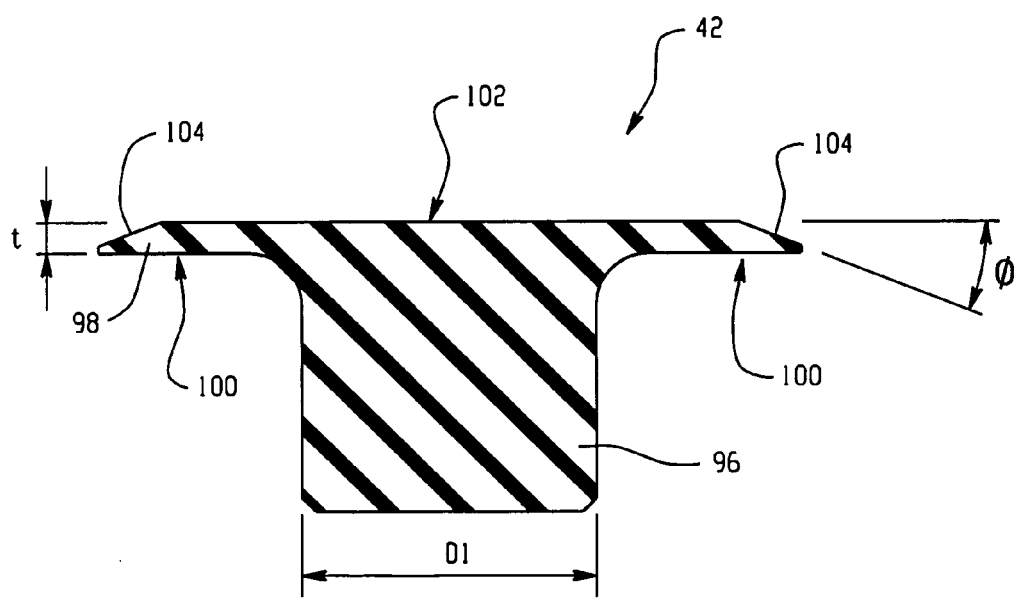
FIG. 8 is a sectional view of the diaphragm of FIG. 7 taken along the 8-8 line in FIG. 7.

FIGS. 7 and 8 illustrate the diaphragm 42 of the exemplary embodiment of FIG. 2. The diaphragm 42 has a generally cylindrical configuration and includes a body portion 96 and a radially-extending, flexible rim 98. The body portion 96 is configured to extend into the central passage 90. Thus, the diameter D1 if the body portion 96 is slightly smaller that the diameter D2 of the opening in the central passage 90 formed radially inward from the ribs 92 (see FIG. 6). As a result, the ribs 92 keep the diaphragm 42 substantially centered along the axis 88.

Referring to FIGS. 7 and 8, the flexible, radially extending rim 98 includes an inlet or supply side 100, an outlet or exhaust side 102, and an outer edge 104 that is feathered or thinner than a radially inner portion of the rim 98. The feathered edge 104 extends radially toward the exhaust side 102 at an angle Φ. The angle Φ may be any angle 45 degrees or less. In one exemplary embodiment, the angle Φ is between 18 and 24 degrees. The thickness t of the flexible rim 98 is generally thinner than the thickness of flat diaphragms used in prior known quick release valves, such as for example, the diaphragm 20 in the valve 10 of FIG. 1. The thickness of known flat diaphragms, such as the diaphragm 20, is generally about 0.060". The thickness t of rim 98 is less than 0.050". In one embodiment, the thickness t is in the range of about 0.040" to 0.050", though thinner is possible. The feathering and thinness improves the overall flexibility of the rim 98, or in other words, the rim 98 is generally more responsive to changes in air pressure than thicker, non-feathered, flat diaphragms.

Those skilled in the art will readily appreciate that the invention may be realized using a variety of materials For example, the diaphragm 42 may be made of or include a flexible portion made of a variety of elastomeric materials that exhibited sufficient flexibility to perform as described herein. Polymeric materials such as nitrile rubber and fluorocarbon polymers have proven sufficient. The housing assembly 32, supply insert 46, and the exhaust insert 48, may be formed of a variety of materials, including but not limited to, plastic, aluminum, zinc, and steel.

Referring to FIG. 2, the supply insert 46 and the exhaust insert 48 are installed within the housing assembly 32 such that the inserts are substantially aligned along the central axis 44, though that is not required. The inserts 46, 48 may attach to the housing assembly 32 in a variety of ways, such as for example, by a threaded connection, adhesives, an interference fit, or other suitable method. The diaphragm 42 resides between the inserts 46, 48 in a free floating manner with the body portion 96 of the diaphragm extending into the central passage 90. The radial clearance c between the outer edge of the rim 98 and an inner surface 106 of the housing 32 is configured to be less than about 0.030". In one embodiment, the clearance c in the range of about 0.015" to 0.020". In another embodiment, the clearance c is in the range of 0.005" to 0.010." The tight clearance helps to restrict the amount of delivery air that flows back from the delivery volume into the supply port 34, while at the same time providing some clearance for swell of the diaphragm 42 and dimensional tolerances.

In an installed configuration, the diaphragm 42 may move between a first position in which the exhaust side 102 of the rim 98 engages the exhaust seat 76 and to a second position in which the supply side 100 of the rim 98 engages the supply seat 94. In the first position, the supply port 34 and the delivery ports 36 are in fluid communication, while the exhaust port 38 is substantially closed by the diaphragm 42. In the second position, the delivery ports 36 and the exhaust port 38 are in fluid communication, while the supply port 34 is closed by the diaphragm 42.

In the exemplary embodiment of FIG. 2, the flow control device is configured as a quick release valve for a vehicle's air brake system. As such, a supply of pressurized air is connected in fluid communication with the supply port 34. The delivery ports 36 are configured to route the pressurized air to the downstream brake components, such as for example, brake chambers. The exhaust port 38 is configured to vent air from the brake system to atmosphere.

Figure 1:
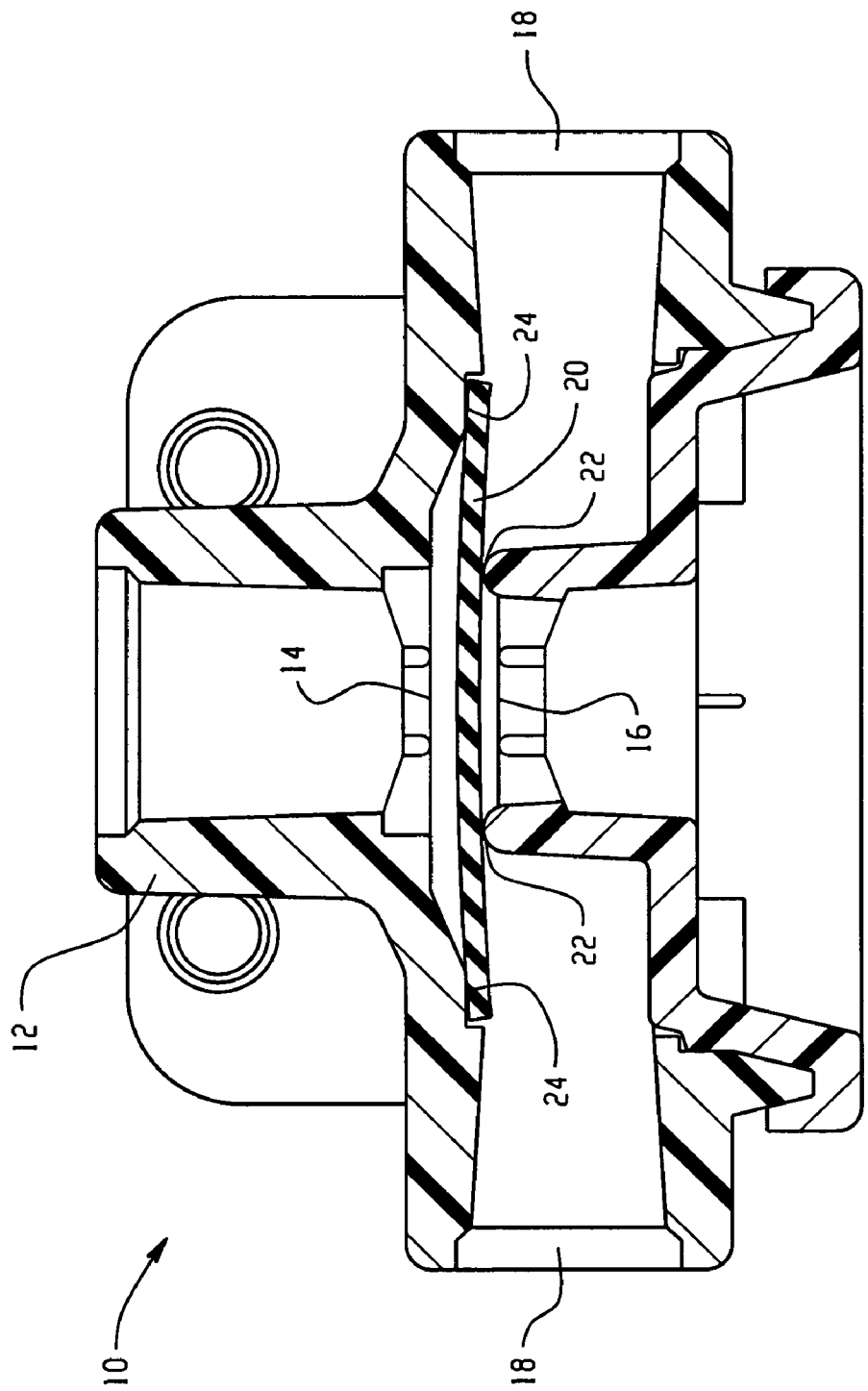
FIG. 1 is an cross section of a prior art quick release valve.

In quick release valves which utilize a flat diaphragm, such as the known example shown in FIG. 1, air pressure on the diaphragm during the air apply mode may cause the flat diaphragm to extrude into the exhaust port. Diaphragm failures or blowouts have been known to result from this. The body portion 96 of the diaphragm 42 according to the present invention, however, provides sufficient support to the diaphragm to substantially eliminate the possibility of the diaphragm extruding into the exhaust port 38. Thus, in general, the portion of the diaphragm 42 that seals against the exhaust seat 76 and covers the exhaust port 38 is thicker than that radially extending rim 98. In one embodiment, the diameter D1 of the body portion 96 is about as wide as the diameter of the exhaust seat 76.

FIG. 2 illustrates the flow control device in an air apply mode. The air apply mode occurs when a brake application is desired, such as for example, when the user depresses the brake pedal (not shown). Pressurized air enters the supply insert 46 and flows around the diaphragm body 96 to the supply port 34. The plurality of openings 86 and radially extending ribs 92 help to guide or direct the air around the body 96. The air pressure causes the exhaust side 102 of the diaphragm 42 to seal against an exhaust seat 76. Because the diaphragm 42 is not constrained between the supply seat 94 and the exhaust seat 76 (i.e. it is free floating) and the flexible rim 98 does not contact the supply seat 94 when the diaphragm 42 engages the exhaust seat 76, air can freely travel from the supply port 34 to the delivery port 36. As a result there is no differential pressure between the supply port 34 and the delivery port 36 during the air apply mode. This reduces the possibly of an unbalanced pressure between the wheels of the vehicle.

Figure 9:
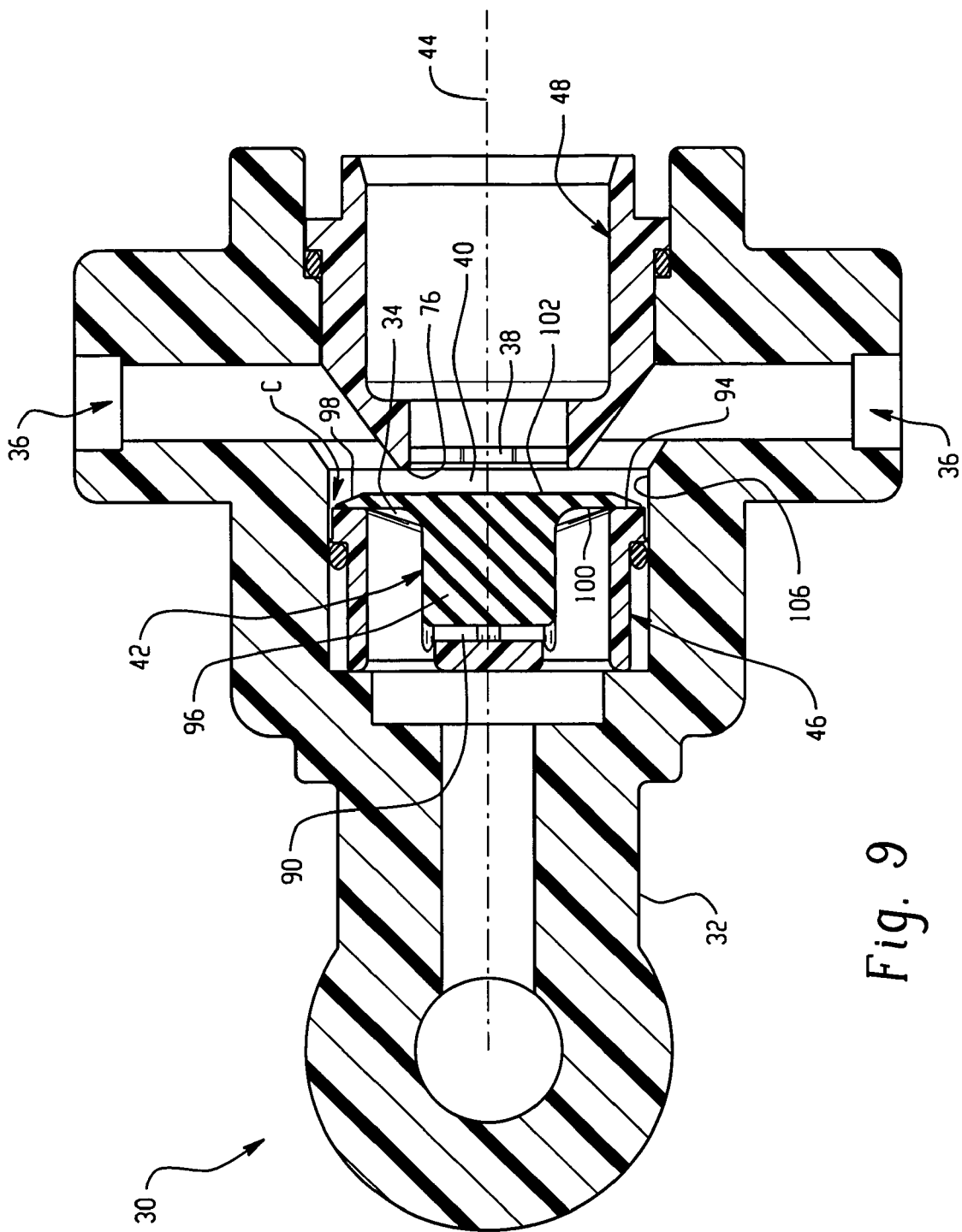
FIG. 9 is a sectional view of the flow control device of FIG. 2 in a second mode.

FIG. 9 illustrates the flow control device in an air release mode. When the user releases the brake pedal, air pressure in the supply port 34 is reduced. As a result, pressurized air that was delivered to the brakes flows back toward the supply port 34. The flexible rim 98, in response to the differential pressure between the delivery ports 36 and supply port 34, flexes into engagement with the supply seat 94. The rim 98 is more sensitive to changes in differential pressure than the diaphragms in known quick release valves, such as the valve 10 of FIG. 1. Thus, even in a low pressure brake application, such as for example, below 30 psi, the rim 98 flexes and engages the inlet seat 94. In one embodiment, the rim 98 will flex and engage the inlet seat 94 at a differential pressure from the delivery port 36 to the supply port 34 of around 20 psi. As a result, the amount of delivery air that flows back into the supply port is minimized, thus minimizing brake release timing.

At about the same time that the rim 98 is flexing toward the supply seat 94, air pressure from the delivery port 36 moves the diaphragm 42 axially away from the exhaust seat 76, thus opening the exhaust port 38. As a result, air from the delivery volume vents through the exhaust port 38.

The action of the diaphragm 42 as described in reference to the exemplary embodiment of FIGS. 2-9 is equally applicable to provide a double check valve function. As described above, the diaphragm, in response to air pressure changes, moves between a first and second position. In the first position, a first port and a second port are in fluid communication while the diaphragm blocks a third port. In a second position, the diaphragm blocks the first port while the second and third ports are in fluid communication. Thus, if the first and third ports are configured as inlet ports and the second port as a delivery port, then the flow control device containing this configuration would function as a double check valve, allowing flow into the delivery port from whichever inlet port has the higher pressure.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:
1. A flow control device, comprising:
a housing assembly including a first seat area circumscribing a first port and
a second seat area circumscribing a second port; and
a movable member disposed between said first port and said second port, said movable member having a body portion extending along an axis and a flexible rim, wherein the flexible rim has an outer edge that is thinner than an inner portion of the rim, and wherein said movable member moves between sealing engagement with said first seat area and sealing engagement with said second seat area in response to a pressure differential across said movable member;
wherein the body portion of the movable member is received inside a central passage in the housing assembly to maintain a substantially uniform radial clearance between the outer edge of the flexible rim and an inner surface of the housing assembly as said movable member moves between sealing engagement with said first seat area and sealing engagement with said second seat area, and wherein the flexible rim extends radially outward of said central passage.

2. The flow control device of claim 1 wherein said movable member is free floating between said first port and said second port along said axis.

3. The flow control device of claim 1 wherein the body portion extends into said first port.

4. The flow control device of claim 1, further comprising an insert, wherein said insert includes said first port, and wherein said insert includes a plurality of openings in fluid communication with said first port.

5. The flow control device of claim 1 wherein said device further comprises a plurality of ribs extending radially inward toward said axis for directing fluid flow around said body portion.

6. The flow control device of claim 1 wherein said body portion is adapted to substantially prevent said movable member from extruding into said second port when said movable member is in sealing engagement with said second seat area.

7. The flow control device of claim 1 wherein said outer edge is tapered a radially extending angle of about 45 degrees or less.

8. The flow control device of claim 1 wherein said outer edge is tapered a radially extending angle of about 18 and 24 degrees.

9. The flow control device of claim 1, wherein a radial clearance between said flexible rim and an inner surface of said housing assembly is less than about 0.0030 inches.

10. The flow control device of claim 1 wherein a radial clearance between said flexible rim and an inner surface of said housing assembly is in the range of about 0.005 inches to 0.020 inches.

11. The flow control device of claim 1 wherein said flexible rim has a thickness in the range of about 0.040 inches to 0.050 inches.

12. The flow control device of claim 1 wherein said movable member will move from sealing engagement with said second seat area to sealing engagement with said first seat area when the differential fluid pressure across said movable member is about 20 psi.

13. The flow control device of claim 1 wherein movement of said movable member from sealing engagement with said second seat area to sealing engagement with said first seat area releases compressed air from a pneumatic brake system.

14. The flow control device of claim 1 further comprising an insert, wherein said insert includes said second port, and wherein said insert includes an opening adapted to form a push-to-connect coupling with a male push-to-connect fitting.

15. The flow control device of claim 4 wherein said plurality of openings are radially spaced proximate to said first port for directing fluid flow around said body portion.

16. The flow control device of claim 4, wherein the central passage is disposed in said insert.

17. The flow control device of claim 1, wherein the central passage comprises a plurality of radially extending ribs sized to receive the body portion therebetween.

18. A flow control device, comprising:
a housing assembly including a first port, a second port, and a third port; and
a movable member including a body portion extending into said first port along an axis and a radially projecting rim having a feathered edge; said movable member disposed between said first port and said second port for moving between a first position in which said movable member substantially seals said second port and allows fluid communication between said first port and said third port, and a second position in which said movable member substantially seals said first port and allows fluid communication between said third port and said second port;
wherein the body portion of the movable member is received inside a central passage in the housing assembly to maintain a substantially uniform radial clearance between the outer edge of the flexible rim and an inner surface of the housing assembly as said movable member moves between said first position and said second position, and wherein the radially projecting rim extends radially outward of said central passage.

19. The flow control device of claim 18 wherein said radially projecting rim flexes into sealing engagement with a seat area that circumscribes said first port when said movable member moves from said first position to said second position.

20. The flow control device of claim 18 wherein said movable member is free floating between said first port and said second port along said axis.

21. The flow control device of claim 18 wherein said body portion is adapted to substantially prevent said movable member from extruding into said second port when said movable member is in said first position.

22. The flow control device of claim 18 wherein said feathered edge extends radially at about 45 degrees or less.

23. The flow control device of claim 18 wherein said feathered edge extends radially at about 18 and 24 degrees.

24. The flow control device of claim 18 wherein a radial clearance between said radially projecting rim and an inner surface of said housing assembly is less than about 0.0030 inches.

25. The flow control device of claim 18 wherein a radial clearance between said radially projecting rim and an inner surface of said housing assembly is in the range of about 0.005 inches to 0.020 inches.

26. The flow control device of claim 18 wherein said radially projecting rim has a thickness in the range of about 0.040 inches to 0.050 inches.

27. The flow control device of claim 18 wherein said movable member moves from said first position to said second position when fluid pressure at said third port is about 20 to 30 psi greater than fluid pressure at said first port.

28. The flow control device of claim 18 wherein movement of said movable member from said first position to said second position releases compressed air from a pneumatic brake system.

29. The flow control device of claim 18 further comprising an insert, wherein said insert includes said second port, and wherein said insert includes an opening adapted to form a push-to-connect coupling with a male push-to-connect fitting.

30. The flow control device of claim 18, further comprising an insert, wherein said insert includes said first port, and wherein said insert includes a plurality of openings in fluid communication with said first port.

31. The flow control device of claim 30, wherein the central passage is disposed in said insert.

32. The flow control device of claim 30 wherein said plurality of openings are radially spaced proximate to said first port for directing fluid flow around said body portion.

33. An air flow control device for a vehicle compressed air system, the device comprising:
a housing assembly including an inlet port, an exhaust port, and a delivery port;
a diaphragm including a body portion extending into said inlet port along an axis and a radially projecting rim having a feathered edge; said diaphragm disposed between said inlet port and said exhaust port for moving between a first position in which said diaphragm substantially closes said exhaust port and allows fluid communication between said inlet port and said delivery port, and a second position in which said diaphragm substantially closes said inlet port and allows fluid communication between said delivery port and said exhaust port; and an insert comprising said inlet port and a plurality of inlet openings proximate to said inlet port, wherein said inlet openings direct inlet air flow around said body portion toward said inlet port;

wherein said radially projecting rim flexes into sealing engagement with a radially extending seat area that circumscribes said inlet port when said diaphragm moves from said first position to said second position.

* * * * *

UNITED STATES PATENT AND TRADEMARK OFFICE
CERTIFICATE OF CORRECTION

PATENT NO. : 7,571,738 B2
APPLICATION NO. : 11/370310
DATED : August 11, 2009
INVENTOR(S) : Ho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this

Seventh Day of September, 2010

David J. Kappos
*Director of the United States Patent and Trademark Office*